United States Patent
Wang et al.

(10) Patent No.: US 12,231,320 B2
(45) Date of Patent: Feb. 18, 2025

(54) ADAPTABLE SOFTWARE DEFINED WIDE AREA NETWORK APPLICATION-SPECIFIC PROBING

(71) Applicant: Juniper Networks, Inc., Sunnyvale, CA (US)

(72) Inventors: Jisheng Wang, Palo Alto, CA (US); Charl Matthee, Cape Town (ZA); Randall Frei, San Jose, CA (US); Jie C Jiang, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/501,190

(22) Filed: Nov. 3, 2023

(65) Prior Publication Data

US 2024/0073117 A1    Feb. 29, 2024

Related U.S. Application Data

(63) Continuation of application No. 17/377,078, filed on Jul. 15, 2021, now Pat. No. 11,811,638.

(51) Int. Cl.
*H04L 43/12* (2022.01)
*H04L 43/026* (2022.01)
*H04L 43/028* (2022.01)

(52) U.S. Cl.
CPC .......... *H04L 43/12* (2013.01); *H04L 43/026* (2013.01); *H04L 43/028* (2013.01)

(58) Field of Classification Search
None
See application file for complete search history.

(56) References Cited

U.S. PATENT DOCUMENTS

| | | | |
|---|---|---|---|
| 7,454,610 B2 | 11/2008 | Buer et al. | |
| 7,908,369 B2 | 3/2011 | Truong et al. | |

(Continued)

FOREIGN PATENT DOCUMENTS

| | | |
|---|---|---|
| EP | 2487842 A1 | 8/2012 |
| WO | 2020091737 A1 | 5/2020 |

OTHER PUBLICATIONS

Extended Search Report from counterpart European Application No. 22184368.3 dated Dec. 13, 2022, 8 pp.

(Continued)

*Primary Examiner* — Phyllis A Book
(74) *Attorney, Agent, or Firm* — Shumaker & Sieffert, P.A.

(57) ABSTRACT

Systems, devices and techniques for an adaptive application-specific probing scheme are disclosed. An example network device includes memory configured to store a network address and probe protocol usable for probing a first network device associated with a source of an application, and one or more processors configured to determine a network address and probe protocol usable for probing the first network device, wherein the first network device comprises a server that is responsive to the probing, the server executing the application for the data flow, or a closest network device, to the server, that is responsive to the probing. The one or more processors are also configured to send to a second network device at a location serviced by the application, a message specifying the network address and probe protocol usable for probing the first network device.

20 Claims, 4 Drawing Sheets

(56) References Cited

U.S. PATENT DOCUMENTS

| | | |
|---|---|---|
| 8,072,901 B1 | 12/2011 | Blair et al. |
| 8,516,129 B1 | 8/2013 | Skene |
| 9,282,043 B1 | 3/2016 | Cao |
| 9,596,164 B1 * | 3/2017 | Kumar .................... H04L 43/12 |
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,419,356 B1 | 9/2019 | Singh et al. |
| 10,432,522 B2 | 10/2019 | Kaplan et al. |
| 10,958,537 B2 | 3/2021 | Safavi |
| 10,958,585 B2 | 3/2021 | Safavi |
| 10,985,969 B2 | 4/2021 | Safavi |
| 11,616,731 B1 * | 3/2023 | Saad ....................... H04L 43/04 370/236 |
| 11,743,151 B2 | 8/2023 | Safavi |
| 12,013,691 B2 * | 6/2024 | Jochim ................... H04W 4/40 |
| 12,089,071 B2 * | 9/2024 | Notargiacomo ...... H04W 8/082 |
| 2002/0069263 A1 | 6/2002 | Sears et al. |
| 2003/0161265 A1 | 8/2003 | Cao et al. |
| 2003/0192042 A1 | 10/2003 | Takemoto et al. |
| 2003/0204619 A1 | 10/2003 | Bays |
| 2003/0214913 A1 | 11/2003 | Kan et al. |
| 2004/0170123 A1 | 9/2004 | Carpenter et al. |
| 2005/0054300 A1 | 3/2005 | Vogel et al. |
| 2005/0232239 A1 | 10/2005 | Ilnicki et al. |
| 2008/0089279 A1 | 4/2008 | Hu et al. |
| 2008/0163185 A1 | 7/2008 | Goodman |
| 2008/0320151 A1 | 12/2008 | McCanne |
| 2009/0279426 A1 | 11/2009 | Mangal |
| 2009/0310485 A1 | 12/2009 | Averi et al. |
| 2009/0327282 A1 | 12/2009 | Wittig et al. |
| 2010/0061388 A1 | 3/2010 | Mataga et al. |
| 2011/0295709 A1 | 12/2011 | Kubo et al. |
| 2012/0057504 A1 | 3/2012 | Tanaka |
| 2012/0257529 A1 | 10/2012 | Ehara et al. |
| 2012/0280952 A1 | 11/2012 | Hsu et al. |
| 2012/0311132 A1 * | 12/2012 | Tychon ................... H04L 43/50 709/224 |
| 2012/0331054 A1 | 12/2012 | Dasgupta |
| 2014/0071807 A1 | 3/2014 | Tohzaka et al. |
| 2014/0226457 A1 * | 8/2014 | Hsueh .................... H04L 43/50 370/216 |
| 2014/0233549 A1 | 8/2014 | Kim et al. |
| 2015/0160931 A1 | 6/2015 | Glazer et al. |
| 2015/0195746 A1 | 7/2015 | Franklin et al. |
| 2015/0208205 A1 | 7/2015 | Chan et al. |
| 2015/0244617 A1 * | 8/2015 | Nakil .................. H04L 41/0895 709/224 |
| 2015/0295808 A1 * | 10/2015 | O'Malley ............... H04L 43/10 709/224 |
| 2015/0341447 A1 | 11/2015 | Patil et al. |
| 2015/0350866 A1 | 12/2015 | Patil et al. |
| 2016/0014020 A1 | 1/2016 | Kafle et al. |
| 2016/0099997 A1 | 4/2016 | Sen et al. |
| 2016/0164978 A1 | 6/2016 | De Lemos et al. |
| 2017/0083277 A1 | 3/2017 | Liu |
| 2017/0094064 A1 | 3/2017 | Kim |
| 2018/0054475 A1 * | 2/2018 | Agarwal ................. H04L 69/40 |
| 2018/0295206 A1 | 10/2018 | Devaraju et al. |
| 2018/0331955 A1 | 11/2018 | Ju et al. |
| 2019/0089761 A1 | 3/2019 | Lee |
| 2019/0123993 A1 | 4/2019 | Rangappagowda et al. |
| 2019/0335002 A1 | 10/2019 | Bogineni et al. |
| 2019/0373521 A1 | 12/2019 | Crawford |
| 2020/0067792 A1 * | 2/2020 | Aktas .................. H04L 41/5009 |
| 2020/0153701 A1 * | 5/2020 | Mohan ................ H04L 41/5009 |
| 2020/0177498 A1 | 6/2020 | Thomas et al. |
| 2020/0259755 A1 | 8/2020 | Wang et al. |
| 2020/0396581 A1 | 12/2020 | Cheong et al. |
| 2020/0403890 A1 | 12/2020 | McCulley et al. |
| 2022/0231952 A1 * | 7/2022 | Barton ................. H04L 43/0864 |
| 2022/0239584 A1 | 7/2022 | Sharma et al. |
| 2022/0272019 A1 | 8/2022 | Zhou |
| 2022/0278922 A1 * | 9/2022 | Kolar .................. H04L 43/0894 |
| 2022/0368643 A1 | 11/2022 | Momchilov |
| 2023/0012609 A1 | 1/2023 | Wang et al. |

OTHER PUBLICATIONS

Prosecution History from U.S. Appl. No. 17/377,078, dated Jun. 1, 2022 through Aug. 29, 2023, 198 pp.

Response to Extended Search Report dated Dec. 13, 2022, from counterpart European Application No. 22184368.3 filed Jul. 18, 2023, 20 pp.

* cited by examiner

ADAPTABLE SOFTWARE DEFINED WIDE AREA NETWORK APPLICATION-SPECIFIC PROBING

This application is a continuation of U.S. patent application Ser. No. 17/377,078, filed 15 Jul. 2021, the entire contents of which is incorporated herein by reference.

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from teleconferencing, multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, and transactions simultaneously. The increased amount and variety of subscriber sessions and packet flows create challenges for network service providers with respect to network performance, such as latency, delay, and jitter.

SUMMARY

In general, the disclosure describes techniques for adaptive application-specific probing based on historical models of the application traffic for particular applications, with the probing process generating various Quality of Experience (QoE) metrics for a data path on which a data flow is transmitted. With the proliferation of video and voice calls, as well as other applications that require specific network performance over a wide area network (WAN), it may be desirable to monitor routes that packets may travel to see if the network is supporting the QoE requirements of these applications. Software-defined WAN (SD-WAN) edge network devices (e.g., routers) usually handle thousands of data streams, over a very large number of different data paths. Computational power limitations and other resource constraints of the SD-WAN edge network device may prevent the SD-WAN edge network device from continuously monitoring all of the possible data paths that packets from the SD-WAN edge network device may take. In effect, due to the resource constraints the SD-WAN edge network device may have a limited probe packet "budget." Also, it may be difficult to determine which specific data paths, out of all of the collection of possible data paths, the SD-WAN edge network device should monitor using its limited probe packet budget.

Many applications may utilize a plurality of sessions or data flows for a particular subscriber device. Each of the data flows may be routed to a same server or different servers. In the example of a Software as a Service (SaaS) application, which server a data flow is routed to may change over time as new data flows are initiated. For example, a video data flow associated with a subscriber device at a particular location may flow to one server if initiated in the morning and a different server if initiated in the afternoon. If an edge network device, such as a SD-WAN router, at a location has a limited probe packet budget, it may be difficult to determine which network devices associated with an application should be probed.

Instead of sending one or more probe packets over each WAN link, the techniques described herein may limit the sending of probe packets to servers (or network devices near the servers) that are historically more likely to be used for meaningful flows from a QoE viewpoint. In this manner, the likelihood of probing a server (or network device near the server) that will actually be associated with a meaningful flow may increase, when probing with a limited probe packet budget, thereby increasing the usefulness of responses to the probing.

A network device may determine the network address of which servers or network devices near the servers that are responsive to probing and which probe protocols may be used to elicit such responses. In this manner, such a network device may be referred to herein as a probe management network device.

The techniques of this disclosure may be used to dynamically determine the destination network address and probe protocol for each application by learning from per-site/per-device historical flow events. Unlike other probe techniques which may be configured statically, the techniques presented herein describe a probing strategy which is learned based on historical information and dynamically changes over time.

While the techniques may include adapting which network devices may be probed, the techniques described herein may also include machine learning techniques to learn various patterns and characteristics of data flows belonging to an application, such as which network device is likely to be involved with a particular data flow at a particular time of day and/or on a particular day of the week. A network device, which may be cloud-based, may store this information in memory and send this information, on a periodic basis, to a network device at the location.

In one example of the techniques described herein, a method includes in response to determining, by a probe management network device and based on one or more characteristics of a data flow associated with an application, that a quality of the data flow is meaningful to a quality of experience of the application: determining, by the probe management network device, a network address and probe protocol usable for probing a first network device associated with a source of the application, wherein the first network device comprises a server that is responsive to the probing, the server executing the application for the data flow, or a closest network device, to the server, that is responsive to the probing; and sending, by the probe management network device and to a second network device at a location serviced by the application, a message specifying the network address and probe protocol usable for probing the first network device.

In another example of the techniques described herein, a probe management network device includes memory configured to store a network address and probe protocol usable for probing a first network device associated with a source of an application; and one or more processors communicatively coupled to the memory and configured to: in response to determining, based on one or more characteristics of a data flow associated with an application, that a quality of the data flow is meaningful to a quality of experience of the application: determine a network address and probe protocol usable for probing the first network device, wherein the first network device comprises a server that is responsive to the probing, the server executing the application for the data flow, or a closest network device, to the server, that is responsive to the probing; and send to a second network device at a location serviced by the application, a message specifying the network address and probe protocol usable for probing the first network device.

In another example of the techniques described herein, a network device includes memory configured to store data indicative of a probe packet budget; and one or more processors communicatively coupled to the memory and configured to: receive a message from another network device, the message comprising a ranking of the most-used applications; and for each of the most-used applications, a ranking of most-used servers for a respective most-used application; and a respective network address and respective probe protocol for each of a plurality of network devices for the respective most-used application; determine, based on the ranking of the most-used application, the ranking of the most-used servers, and the probe packet budget, a subset of the plurality of network devices; and send an out-of-band probe packet to each of the subset of the plurality of network devices, based on the respective network address and the respective probe protocol, wherein each of the plurality of network devices comprises a server that is responsive to probing, the server executing the application for a respective data flow, or a closest network device, to the server, that is responsive to the probing.

The details of one or more examples are set forth in the accompanying drawings and the description below. Other features, objects, and advantages will be apparent from the description and drawings, and from the claims.

DETAILED DESCRIPTION

Figure 1:
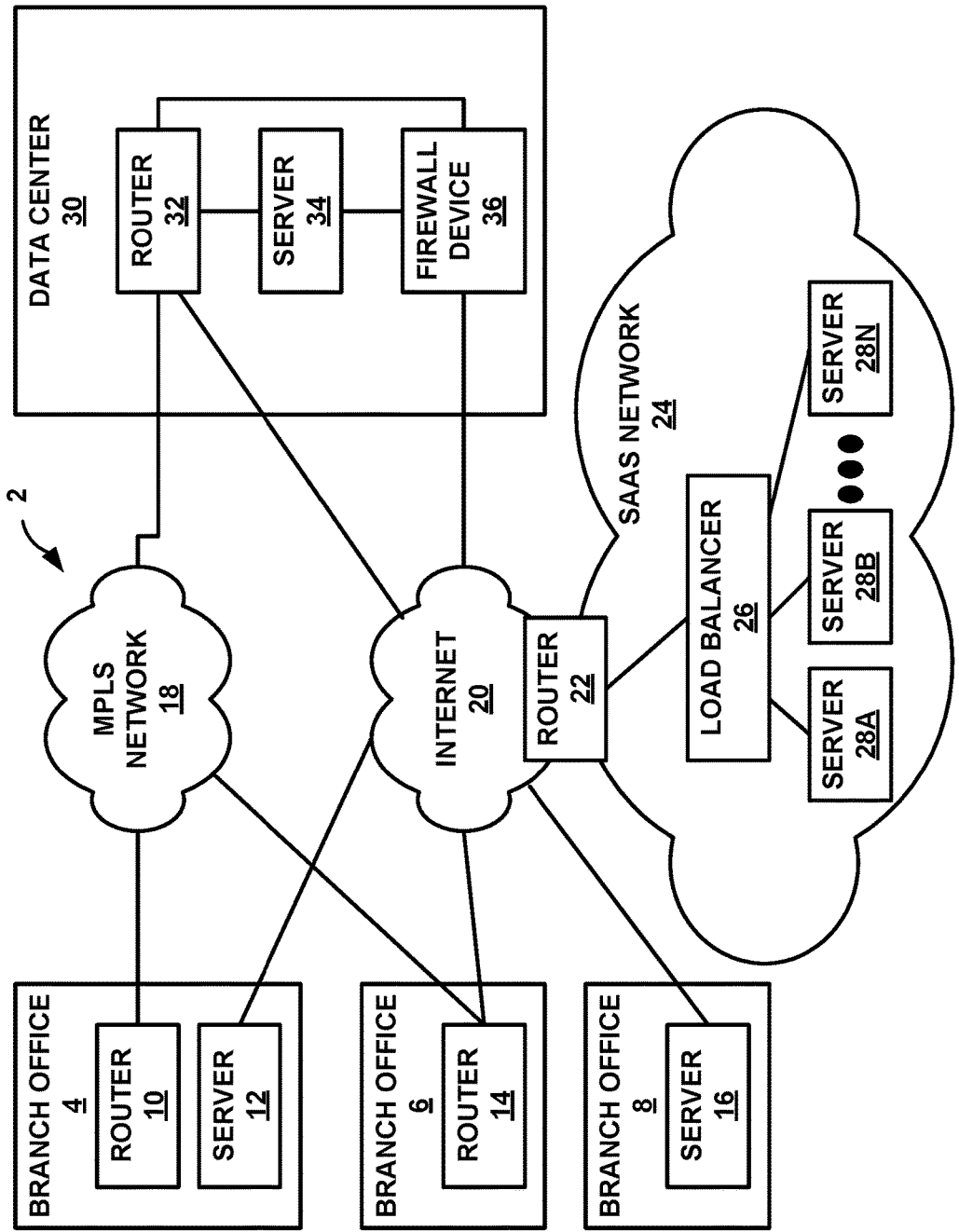
FIG. 1 is a block diagram illustrating an example software-defined wide area network (SD-WAN) system that performs adaptable application-specific probing, in accordance with the techniques of this disclosure.

FIG. 1 is a block diagram illustrating an example software-defined wide area network (SD-WAN) system that performs adaptable application-specific probing, in accordance with the techniques of this disclosure. The example network system of FIG. 1 includes an SD-WAN system 2. In the example of FIG. 1, SD-WAN system 2 comprises a software defined network (SDN) and network functions virtualization (NFV) architecture. An SDN controller device (not shown) may provide a high-level controller for configuring and managing the routing and switching infrastructure of SD-WAN system 2. In some instances, the SDN controller device manages deployment of virtual machines (VMs) within the operating environment of data center 30.

SD-WAN system 2 includes branch office 4, branch office 6, and branch office 8. Each of branch office 4, branch office 6, and branch office 8 may be located at different geographic locations. Branch office 4 includes router 10 and server 12. Router 10 and server 12 may be communicatively coupled to various subscriber devices (not shown for simplicity purposes), such as desktop computers, laptop computers, smart phones, tablets, and the like.

A subscriber may represent, for instance, an enterprise, a residential subscriber, or a mobile subscriber. Each of subscriber devices may run a variety of software applications, such as word processing and other office support software, web browsing software, software to support voice calls, video games, video conferencing, and email, among others. For example, subscriber device may be a variety of network-enabled devices, referred generally to as "Internet-of-Things" (IoT) devices, such as cameras, sensors (S), televisions, appliances, and the like. In addition, subscriber devices may include mobile devices that access the data services of SD-WAN system 2 wirelessly through an edge network device, such as router 10. Example mobile subscriber devices include mobile telephones, laptop or desktop computers having, e.g., a 5G wireless card, wireless-capable netbooks, video game devices, pagers, smart phones, personal data assistants (PDAs) or the like.

A network service provider that administers at least parts of SD-WAN system 2 typically offers services to subscribers associated with subscriber devices that access SD-WAN system 2. Services offered may include, for example, traditional Internet access, VoIP, video and multimedia services, and security services. As described above with respect to router 10 may support multiple types of access network infrastructures that connect to service provider network access gateways to provide access to the offered services. In some instances, the network system may include subscriber devices that attach to multiple different access networks having varying architectures.

In general, any one or more of the subscriber devices may request authorization and data services by sending a session request to a gateway device, such as router 10. In turn, router 10 may access a central server (not shown) such as an Authentication, Authorization and Accounting (AAA) server to authenticate the one of the subscriber devices requesting network access. Once authenticated, any of the subscriber devices may send subscriber data traffic toward router 10 to access and receive services provided by MPLS network 18, Internet 20, or SaaS network 24.

Router 10 may be a SD-WAN edge router, such as a customer edge (CE) router or a provider edge (PE) router. Server 12 may be an SD-WAN edge server, such as a CE server or a PE server. In some examples, branch office 4 may include a plurality of routers or a plurality of servers.

Branch office 6 includes router 14. Router 14 may be communicatively coupled to various subscriber devices. Router 14 may be a SD-WAN edge router, such as a customer edge (CE) router or a provider edge (PE) router. In some examples, branch office 6 may include a plurality of routers (not shown).

Branch office 8 includes server 16. Server 16 may be communicatively coupled to various subscriber devices (not shown for simplicity purposes). Server 16 may be an SD-WAN edge server, such as a CE server or a PE server. In some examples, branch office 8 may include a plurality of servers (not shown).

Branch offices 4, 6, and 8 may each include an access network (not shown), such as broadband access network, a wireless LAN, a public switched telephone network (PSTN), a customer premises equipment (CPE) network, or other type of access network, and may include or otherwise provide connectivity for cellular access networks, such as a radio access network (RAN). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the 3rd Generation Partnership Project (3GPP), 3rd Generation Partnership Project 2 (3GGP/2) and the WiMAX forum.

In examples that include a wireline/broadband access network, router 10 may represent a Broadband Network Gateway (BNG), Broadband Remote Access Server (BRAS), MPLS PE router, core router or gateway, or Cable Modem Termination System (CMTS). In examples that include a cellular access network, router 10 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 10 may be implemented in a switch, service card or another network device or component.

In some examples, router 10, router 14, router 32, or router 22 may be physical routers. In some examples, router 10, router 14, router 32, or router 22 may be software-based virtualized routers executing on virtual machines or containers on a general-purpose server. Additional information regarding software-based virtualized routers is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

SD-WAN system 2 also includes Multi-Protocol Label Switching (MPLS) network 18, Internet 20, data center 30 and Software as a Service (SaaS) network 24. MPLS network 18 may implement MPLS forwarding. Data center 30 may be a regional hub and include router 32, server 34, and firewall device 36. In some examples, data center 30 may include a plurality of servers, a plurality of routers, or a plurality of firewall devices.

MPLS network 18 and Internet 20 provide packet-based services that are available for request and use by subscriber devices at branch office 4, branch office 6, and branch office 8. As examples, MPLS network 18 and Internet 20 may provide bulk data delivery, voice over Internet protocol (VoIP), Internet Protocol television (IPTV), Short Messaging Service (SMS), Wireless Application Protocol (WAP) service, or customer-specific application services. For example, Internet 20 may provide SaaS application services from SaaS network 24 to the subscriber devices.

SaaS network 24 may be a network operated by a vendor of a SaaS application. A SaaS application is a cloud-based software application delivered by SaaS network 24 to customers (e.g., at branch offices 4, 6, 8) via the Internet 20. For example, rather than execute an application owned by a person or an enterprise on a local server located at a branch office location of the person or enterprise, such as server 12, or a remote server owned or leased by the person or enterprise in a data center, such as server 34, the person or enterprise may license use of an application from a third party which may execute in servers of SaaS network 24. As such, network devices at the branch office associated with the person or enterprise may have less control over and insight into which server is executing the application being delivered by SaaS network 24. Some examples of SaaS applications that may be provided by SaaS network 24 include video conference software applications, customer relations management software applications, workplace productivity applications, online workspace applications, document storage applications, compute applications, database applications, analytics applications, and other types of applications. In some examples, an entity may use a SaaS application on a subscription basis, e.g., by a monthly or annual subscription, which may be free or fee-based.

SaaS network 24 includes router 22, which may be a SD-WAN router or gateway, load balancer 26, and servers 28A-28N. In some examples, SaaS network 24 may include a plurality of routers or a plurality of load balancers. Servers 28A-28N ("servers 28") may include any number of servers. In some examples, servers 28 of SaaS network 24 are geographically co-located. In other examples, servers 28 of SaaS network 24 are geographically dispersed. In such examples, each geographical location may have one or more routers, one or more load balancers, and one or more of servers 28.

Many SaaS applications may use multiple data flows at the same time for delivering one instance of the application. The quality of certain data flows of the multiple data flows may be meaningful for the application's QoE, e.g., may have a significant or measurable impact on the application's QoE, while others may not be. The data flows that may be meaningful for a QoE of an application are referred to herein as "meaningful flows." For example, a probe management network device may determine that a quality of a specific data flow from a location is meaningful to a QoE of the application. The probe management network device may determine a network address and probe protocol of a first network device to which the first network device will respond that is associated with a data flow, the quality of which is meaningful for the QoE of the application. The first network device may be a server that responds to a probe packet associated with a probe protocol. Or, if the server does not respond to probe packets of various probe protocols, the first network device may be a closest network device to the server, and which closest network device responds to a probe packet associated with a probe protocol.

As subscriber devices at a location, such as branch office 4, 6, or 8, may have more than one meaningful flow for a SaaS application that may be associated with different of servers 28, and the subscriber devices may use more than one SaaS application, it may be desirable to rank the SaaS applications, the servers most often associated with meaningful data flows, and/or the meaningfulness of data flows to the QoE of a given SaaS application (e.g., the degree to which an issue with a data flow will impact the SaaS application's QoE). By ranking the SaaS applications, the servers most often associated with meaningful data flows, and/or the meaningfulness of data flows to the QoE of a given SaaS application, a second network device, such as router 10, may probe the more relevant network devices associated with meaningful data flows while remaining within the second network device's limited probe packet budget. Therefore, in some examples, the probe management network device may determine rankings of various applications and the associated servers to which the data flows may be routed based on usage of the various applications, the servers most often associated with meaningful data flows, and/or the meaningfulness of the data flows to QoE of the various applications. The rankings, the network addresses, and the probe protocols may be sent in a message to a second network device at the location. The second network device may send a plurality of probe packets up to the probe packet budget of the second network device to different network devices (e.g., to different first network devices, such as server 28A, router 22, or load balancer 26) based on the network addresses, the probe protocols, and/or the rankings. In this manner, the second network device may probe the higher ranked network devices within the second network device's limited probe packet budget. The second network device may use a response from a respective first network device to determine a QoE associated with the respective data flow.

Router 10 of branch office 4 may provide access to an application executing on one or more of servers 28A-28N via MPLS network 18 and data center 30 for one or more subscriber devices in the location of branch office 4. For example, router 10 may route data flows associated with the application through MPLS network 18, to router 32 to Internet 20 (either directly, or through firewall device 36). The data flows may be routed to router 22 from Internet 20. The data flows may be received by load balancer 26. Load balancer 26 may be configured to balance data flows across servers 28A-28N, such that processing loads on servers 28A-28N are relatively balanced in an attempt to avoid overloading one or more of servers 28A-28N. Because an administrator at branch office 4 is not in control of SaaS network 24, a certain type of flow, video for example, from router 10 associated with an application executing on servers 28A-28N, may not always be handled by the same server of servers 28A-28N. This makes it difficult for the administrator or router 10 to determine which server of servers 28A-28N to probe with a probe packet, especially when router 10 may have a limited probe packet budget, as router 10 may be dedicating most of the processing power of router 10 to routing active data flows. Server 12 may also access the application executing on one or more of servers 28A-28N via Internet 20, either directly through router 22, or through data center 30.

Router 14 of branch office 6 may provide access for the plurality of subscriber devices at the location of branch office 6 to the application executing on one or more of servers 28A-28N. For example, router 14 may route data flows associated with the application through MPLS network 18, to router 32 to Internet 20 (either directly, or through firewall device 36). The data flows may be routed to router 22 from Internet 20. The data flows may be received by load balancer 26 which may distribute the data flows to various of servers 28A-28N.

Server 16 of branch office 8 may provide access to for the plurality of subscriber devices at the location of branch office 8 to the application executing on one or more of servers 28A-28N via Internet 20, either directly through router 22, or through data center 30.

Each of router 10, server 12, router 14, and server 16 may have a limited probe packet budget. Such devices may employ out of band probing on a limited number of data paths for SaaS applications, rather than in-band static probing. Out-of-band probing, synthetic probing, or "active monitoring," refers to sending a probe packet separately from the in-band data flow. In other words, an out-of-band probe packet is not live data of the data flow. Rather than relying on a Domain Name Service (DNS) to find one application server, the techniques of this disclosure may employ a dynamic approach with selective probing based on use, time of day, day of the week, or other attributes. Such techniques may improve the chance that a data path handling a meaningful data flow is probed. By improving the chance that the data path handling a meaningful data flow is probed, the SD-WAN system may be able to determine more relevant QoE statistics from probing, such as for providing WAN assurance.

According to the techniques of this disclosure, to better determine which servers of servers 28A-28N, network devices, such as router 10, server 12, router 14, and server 16 should send probe packets to, a network device, such as server 34 of data center 30, may be configured to determine that a quality of a data flow is meaningful to a QoE of the application based on one or more characteristics of the data flow. For example, router 10 may perform a deep packet inspection of a data flow to determine the one or more characteristics of the data flow. Router 10 may store the characteristics in a flow table which router 10 may send to server 34. For example, the characteristics may include a start time of the data flow, an end time of the data flow, and a classification of the data flow (e.g., a video data flow).

For example, if the application is a video teleconferencing application, server 34 or router 10 may determine that a data flow is a video data flow and determine that the quality of the video data flow is meaningful to a QoE of the video teleconferencing application. Examples of other data flows of which the quality may be meaningful to a QoE of the video teleconferencing application may include a voice data flow, a data flow including shared screen content, a chat data flow, and the like.

For example, server 34 may collect statistics of the various data flows through the customer edge network devices. For example, each of router 10, server 12, router 14, and server 16 may monitor data flows and report statistics related to the data flows to server 34. Server 34 may use the collected statistics to identify routes that are used to transport large data flows and/or real-time data flows. For example, large data flows and/or real-time data flows may be associated with real-time applications, such as Voice over Internet Protocol (VoIP) or video applications, or applications for which high QoE is relatively important (e.g., meaningful flows). In some examples, server 34 may determine a histogram including the frequency of using particular data paths and the number of meaningful data flows. Server 34 or a given edge network device, such as router 10, may select a number (e.g., 10) of the top important data paths for the router 10 to probe.

For example, server 34 or router 10 may, each time a particular application, such as a SaaS application, determine and store the network address associated with the server executing the application for a meaningful data flow. Server 34 or router 10 network device may repeat this technique for numerous invocations of the application, resulting in obtaining and storing the network addresses of a plurality of SaaS servers associated with a specific SaaS application. For example, server 34 or router 10 may learn which SaaS servers a branch office 4 or router 10 may be associated with.

In some examples, server 34 may establish a table 58 of network addresses that can be probed per each application and the specific probing protocol that may be used. In some examples, there may be multiple tables, each associated with a location, network device (e.g., router 10), or interface port of a network device. Server 34 may analyze the associated information and determine which network addresses should be probed per each application and which probing protocol should be used. In some examples, rather than server 34 performing these techniques, router 10, server 12, router 14, server 16 or a combination of server 34 and router 10, server 12, router 14, or server 16 may perform these techniques.

In some examples, server 34 may identify the most popular application(s) from each branch office 4, 6, and 8 or from each of router 10, server 12, router 14, and server 16, based on historical flow usage statistics as well as the most likely destination network addresses and probe protocols for each popular application. Server 34 may send a message to each of router 10, server 12, router 14, and server 16, including which network addresses to probe and which probe protocol to use. These messages may be unique to each network device as meaningful data flows from router 10 may be handled by different servers of servers 28A-28N than meaningful data flows from router 14, for example. Alternatively, server 34 may send a message to each of router 10, server 12, router 14, and server 16, including a ranking of network addresses and probe protocols associated with each network address, in which case, router 10, server 12, router 14, and server 16 may determine which network addresses to probe based on the rankings and limited probe packet budget of each of router 10, server 12, router 14, and server 16. In this manner, the techniques of this disclosure may be used to dynamically determine the network address and probe protocol for each meaningful data flow for an application by learning from per-site or per-device historical flow events, and utilize this determination to dynamically determine which network data paths should be probed with the limited number of probe packets. As the underlying usage of the applications changes, the network paths that are to be monitored using probe packets may dynamically change to improve the chance that the most critical data paths are monitored.

In some examples, when less than a predetermined number (e.g., 10) of SaaS applications are invoked by a particular location (e.g., branch office 4) or through a particular edge network device (e.g., router 10), or interface port of the network device, the edge network device may send a predetermined number (e.g., 10) of probe packets to assess the QoE of meaningful data flows associated with the applications. In some examples, the number of probe packets the edge network device sends may vary over time. In some examples the predetermined number of SaaS applications and the predetermined number of probe packets may be different. When more than the predetermined number of SaaS applications are invoked, the edge network device or server 34 may use heuristics to determine which paths are relatively more important for further probing.

The probe management network device (e.g., server 34) may be configured to, in response to determining that the quality of the data flow is meaningful to a quality of experience of the application, determine a network address and probe protocol usable for probing a server of servers 28A-28N that the data flow may be associated with. For example, server 34 may read a network address of one of servers 28A-28N from a flow table sent by router 10. Server 34 may send a probe packet with a particular probe protocol to the server having the network address, e.g., server 28A. For example, the probe protocol may be HTTP, ICMP, or any other application-specific protocol. For security reasons, many servers are protected from a denial of service or distributed denial of service attack by a firewall or other technique that may prevent the server from respond to probing. If server 28A does not respond to the probing with the particular probe protocol, server 34 may try probing server 28A with a different probe protocol. Server 34 may continue probing server 28A with different probe protocols until the server 34 either receives a response from server 28A or until server 34 exhausts the different probe protocols.

If server 28A does respond to a probe packet from server 34, server 34 may store the network address of server 28A and the probe protocol used to elicit the response from server 28A in memory. If server 28A does not respond to any of the probe packets from server 34, server 34 may attempt to elicit a response to a probe packet from a network device near server 28A. Server 34 may continue sending probe packets with different probe protocols until a network device responds to the probe packet. When a network device does respond to the probe packet, server 34 may store the network address of that network device, e.g., router 22, and the probe protocol of the probe that elicited the response.

For example, server 34 may determine a network address of a network device (e.g., router 22) within the shortest distance to server 28A that replies to a probe packet. In some cases, server 34 may dynamically infer a subnet hosting a SaaS application session, from among a large number of possible different subnets, based on individual destination addresses of data flows. The individual destination addresses of the data flows may be identified using deep packet inspection, for example. For example, if the server 34 determines that the network addresses of the servers observed as destination addresses of the data flows and which do not reply to probe messages are 192.168.1.15, 192.168.1.17, and 192.168.1.32, the probe management network device may attempt to probe all of the addresses in the subnet 192.168.1.xx. For example, 192.168.1.0 may be a network address of router 22 that may respond to a probe packet. In this manner, the network device having the network address 192.168.1.0 may be said to be a closest network device, to the server, that is responsive to the probing.

In some examples, server 34 may also store heuristics regarding the data flows in memory. For example, server 34 may store a start time and an end time for a data flow. In this manner, server 34 may obtain information regarding which times a particular type of data flow may be more likely to be associated with a particular network device.

In some examples, server 34 may perform such techniques for each edge network device or each interface port of each network device at each location. For example, server 34 may perform these techniques for router 10, server 12, router 14, and server 16. For example, in order to manage performance for all people in a given teleconferencing call, it may be desirable to probe meaningful data flows from each edge device being used by people on the teleconferencing call. Thus, the techniques of this disclosure may be used by a probe management network device for each edge network device. In some examples, server 34 may perform these techniques for a plurality of applications each associated with an SaaS network, such as SaaS network 24. In some examples, server 34 may determine for a given edge network device, such as router 10, the most-used applications and rank the most-used applications based on usage. For each of the most-used applications, server 34 may also determine the most-used servers for meaningful data flows and rank the most used servers based on the most used applications and the determined most used servers. In this manner, server 34 may determine, based on historical data, which servers are more likely to be involved in a meaningful data flow. In some examples, server 34 may employ a machine learning or artificial intelligence algorithm to predict which servers are more likely to be involved in a meaningful data flow. In some examples, server 34 will incorporate heuristics, such as what times of day a meaningful data flow may be sent to a particular server. In this manner, the probe management network device may learn to predict which particular server a given meaningful data flow may be routed to from a specific edge network device at a particular time of day and/or on a particular day of the week. By successfully predicting which server a particular data flow may be routed to from a particular edge network device at a particular time of day and/or on a particular day of the week, the particular edge network device may be better able to probe the actual data path of the particular data flow which may enable better management of QoE of SD-WAN system 2. For example, by monitoring the probes for delay, jitter, and other parameters, SD-WAN system 2 may identify the QoE that specific routes provide.

As described herein, elements within SD-WAN system 2, such as router 10, perform application data monitoring using various application quality of experience (QoE) metric functions, such as real-time performance monitoring (RPM) or two-way active measurement protocol (TWAMP), for example. That is, RPM and TWAMP may be used within SD-WAN system 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, router 10 is configured to perform the QoE metric predictions. Router 10 allows for load sharing across connections and adjusts traffic flows based on network conditions to improve performance.

Router 10, which performs the traffic monitoring functions described herein, also may determine QoE metrics, such as service level agreement (SLA) metrics that include round-trip time (RTT), jitter, and packet loss, which were influenced by applications' real-time parameters like packet size, queues and burst of packets to determine the best path.

Despite the dynamic nature of the servers handling a given meaningful data flow, applications may have patterns to their changing servers, and these patterns can be learned and accounted for by the system described herein. In some instances of the techniques described herein, server 34 is configured to predict which server(s) of servers 28A-28N is likely to handle a meaningful flow for a particular location, edge network device, such as router 10, or interface port of an edge network device. In such instances, server 34 may inform router 10 of such likelihood and router 10 may send probe packet to one or more particular servers of servers 28A-28N (and/or of another SaaS network) based on such information. In this way, router 10 is more likely to probe a data path of a meaningful data flow than if router 10 were to probe a static network address. This may lead to router 10 more quickly determining when there is an SLA violation in order to take action to ensure a minimal loss in the various QoE metrics for the particular application.

In some examples, the metrics carried by QoE probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

Server 34 may periodically send a message to the customer edge network devices, such as router 10, with information based on the historical information server 34 has analyzed. For example, server 34 may send a message to router 10 that include the ranking of the most used applications (e.g., the most used SaaS applications) and, for each meaningful data flow for each most used application, the ranking of the most used servers for the respective most used application. The message may also include the network address and probe protocol for each determined network device (e.g., server 28A or router 22) associated with meaningful data flows that responded to probing.

In some examples, server 34 may employ various machine learning techniques in determining which network devices are most likely to be associated with a given meaningful data flow. Machine learning may refer to a set of mathematical modeling processes that allow a computer to learn without being explicitly programmed. For example, machine learning may include Monte Carlo simulation style experimentation. Machine learning for purposes of device modeling may require large amounts of operational data with a high amount of entropy (or, in other words, randomness) relative to other types of modeling algorithms. For accurate model creation, machine learning may employ real world data, but such real-world data is often difficult to collect due to privacy and other concerns. Furthermore, machine learning may require data from most if not all available parameter configurations.

For instance, server 34 may analyze various network devices associated with meaningful flows to generate a model of which network devices that may respond to a probe packet may be associated with a meaningful flow for a given edge network device, such as router 10, for a particular application at a given time of day and/or on a given day of the week. A large amount of data may be fed into server 34 to create the initial model, with a significant number of examples of network devices associated with meaningful flows may be analyzed by server 34. Upon receiving further information regarding application traffic, server 34 may compare the servers or other network devices associated with meaningful flows for a particular edge network device, such as router 10, trained into server 34. Based on how the further information compares to the network devices associated with meaningful flows for the particular edge network device trained into server 34, server 34 may determine whether, and to what extent, server 34 may need to update the machine learning model. Server 34 may consistently adjust the machine learning model to keep an up-to-date record of possible variations in the flow path of particular application's traffic for a given edge network device.

Similarly, server 34 may also employ machine learning techniques to generate model of which applications may be most used at a given location (or through a given edge network device or a given interface port of the edge network device) during a given time of day and/or day of the week. Server 34 may use historical data of most used applications to generate the model and may update the model based on further information received from an edge network device, such as router 10 over time.

According to the techniques of this disclosure, by determining a network address and probe protocol usable for probing a first network device (e.g., server 28A) and sending to a second network device (e.g., router 10) at a location serviced by an application, a message specifying the network address and probe protocol usable for probing the first network device, server 34 may enable the second network device to more efficiently use its resources. For example, the second network device may use less CPU processing power or less bandwidth than it otherwise would, as the second network device does not need to determine which network devices associated with a data flow are responsive to probing or to what probing protocol a given network device may be responsive. Furthermore, the techniques of this disclosure allow the second network device to stay within a probe packet budget which also may reduce the amount of CPU processing power or bandwidth the second network device would otherwise use, for example, if it were to probe all the data flows associated with SaaS applications. In addition, the techniques of this disclosure may facilitate the second network device probing more frequently-used data paths associated with meaningful data flows of more frequently used SaaS applications, rather than probing all data paths associated with all SaaS applications. In this manner, the second network device may probe the relatively more important data paths and not probe the relatively less important data paths so as to efficiently use its limited probing resources, and so as not to overwhelm the network with probe packets on all paths all the time. Responses received by the second network device may be used to determine which data paths may meet SLA requirements and which data paths may not meet SLA requirements. This information may be useful for rerouting network traffic to data paths that do meet SLA requirements or determining whether a poor QoE is due to network equipment within SaaS network 24 or outside of SaaS network 24. Accordingly, the techniques of this disclosure enable a network device, such as server 34, to determine when a QoE problem is associated with a SaaS network, such as SaaS network 24. In the absence of the techniques of this disclosure, this can be difficult or impossible to determine because active probing of network devices in a SaaS network may not be efficient and scalable.

Figure 2:
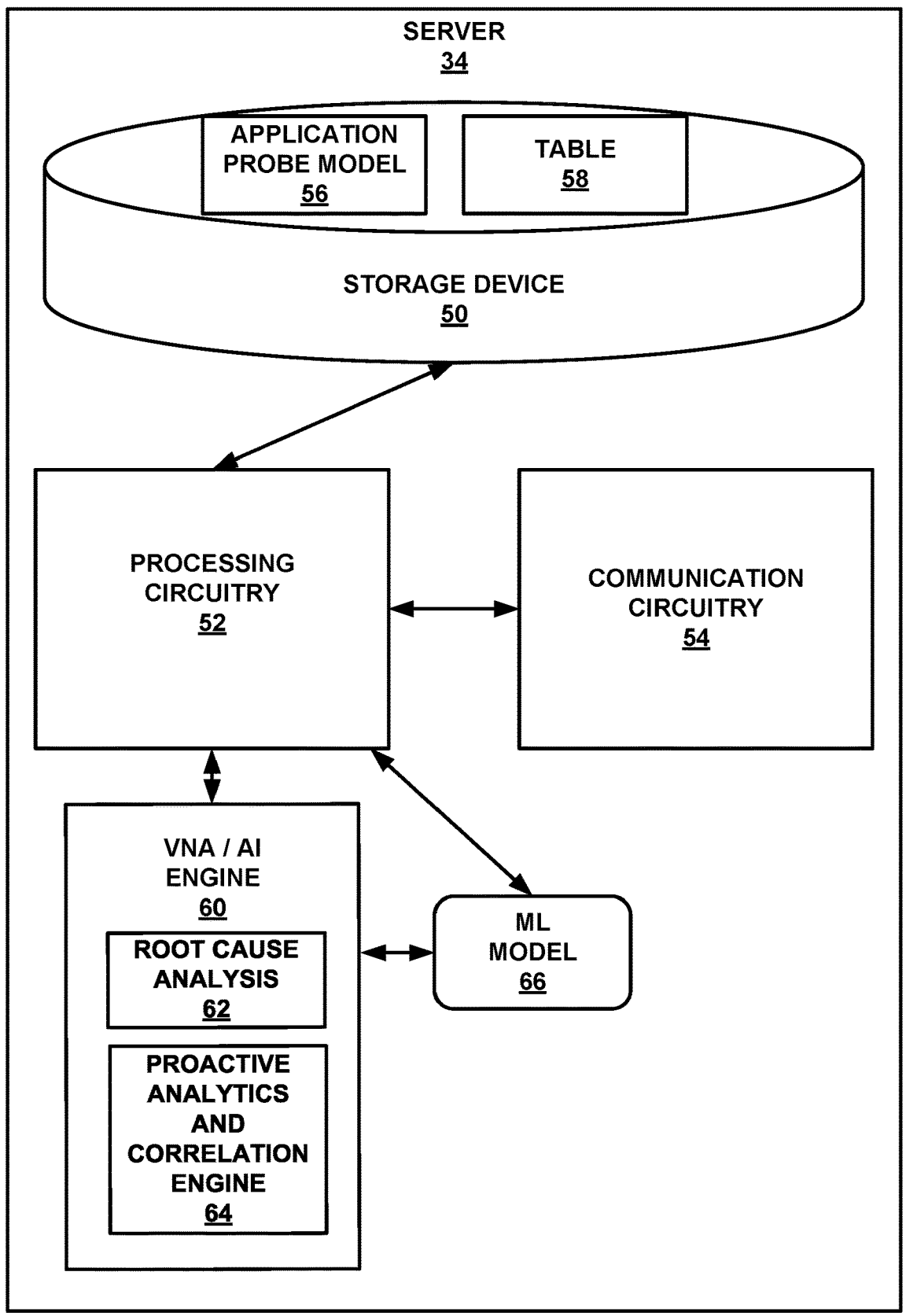
FIG. 2 is a block diagram illustrating an example server that determines adaptable application-specific probing techniques in accordance with the techniques of this disclosure.

FIG. 2 is a block diagram illustrating an example server that determines adaptable application-specific probing techniques in accordance with the techniques of this disclosure. Server 34 includes storage device 50, processing circuitry 52, and communication circuitry 54.

Processing circuitry may include one or more general- or special-purpose processors such as a microprocessor, digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as application probe model 56 may be operable by processing circuitry 52 to perform various actions, operations, or functions of server 34. For example, processing circuitry 52 of server 34 may retrieve and execute instructions stored by storage device 50 that cause processing circuitry 52 to perform the operations of application probe model 56.

Storage device 50 within server 34 may store information for processing during operation of server 34 (e.g., server 34 may store data accessed by application probe model 56 during execution at server 34). In some examples, storage device 50 is a temporary memory, meaning that a primary purpose of storage device 50 is not long-term storage. Storage device 50 of server 34 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage device 50, in some examples, also includes one or more computer-readable storage media. Storage device 50, in some examples, includes one or more non-transitory computer-readable storage mediums. Storage device 50 may be configured to store larger amounts of information than typically stored by volatile memory. Storage device 50 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage device 50 may store program instructions and/or information (e.g., data) associated with application probe model 56.

Communication circuitry 54 may be configured to transmit and receive messages from other network devices, such as router 10. Communication circuitry 54 may use any necessary protocol for such communications. For example, communication circuitry 54 may be configured to send probe packets of various protocols to servers 28A-28N, load balancer 26, router 22, or other network devices in an attempt to find a server or network device near a server that is responsive to probing. Communication circuitry 54 may also be configured to send and receive messages from edge network devices, such as router 10.

In accordance with the techniques described herein, processing circuitry 52 of server 34 execute application probe model 56 and dynamically adapt a probing scheme on a per-device, per-application basis. In some examples, communication circuitry 54 of server 34 may receive messages from an edge network device, such as router 10, including a flow table with a start time, an end time, a classification of the data flow, and a network address of a server associated with the data flow. Based on these messages, processing circuitry 52 may update application probe model 56, and store application probe model 56 in memory.

In some examples, server 34 may implement a network management system. In such examples, server 34 may be responsible for managing network devices, such as router 10. For example, server 34 may observe, collect and/or receive event data, which may take the form of data extracted from messages, counters and statistics, for example, from edge network devices, such as router 10. For example, router 10 may send a message to server 34 including metrics regarding the responses router 10 may receive to sent probe packets.

In such instances, server 34 may include virtual network assistant/artificial intelligence engine 60 (VNA/AI). VNA/AI engine 60 may analyze data received from edge network devices, such as router 10, as well as its own data to identify when undesired to abnormal states are encountered in SD-WAN system 2. For example, VNA/AI engine 60 may use root cause analysis module 62 to identify the root cause of any undesired or abnormal states. In some examples, root cause analysis module 62 utilizes artificial intelligence-based techniques to help identify the root cause of any poor service level experience (SLE) metric(s) in SD-WAN system 2. In addition, VNA/AI engine 60 may automatically invoke one or more corrective actions intended to address the identified root cause(s) of one or more poor SLE metrics. Examples of corrective actions that may be automatically invoked by VNA/AI engine 60 may include, but are not limited to, invoking an API to reboot one or more network devices. The corrective actions may further include restarting a switch and/or a router, invoke downloading of new software to a network device, switch, or router, etc. These corrective actions are given for example purposes only, and the disclosure is not limited in this respect. If automatic corrective actions are not available or do not adequately resolve the root cause, VNA/AI engine 60 may proactively provide a notification including recommended corrective actions to be taken by IT personnel to address the network error.

Proactive analytics and correlation engine (PACE) 64 of VNA/AI engine 60 may, in some examples, dynamically construct, train, apply and retrain unsupervised ML model(s) 66 to event data (SLE metrics 316) to determine whether the collected network event data represents anomalous behavior that needs to be further analyzed by root cause analysis module 62 of VNA/AI engine 60 to facilitate identification and resolution of faults.

PACE 64 may then apply the ML model to data flows and/or logs of newly collected data of various network event types (e.g., statistics, messages, SLE metrics or the like, herein referred to as "PACE" event data of event type) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of ML model 66 by PACE 64 to the network event data indicates that mitigation is required, server 34 may invoke a more complex root cause network analytics component of VNA/AI engine 60 to identify a root cause of the anomalous system behavior and, if possible, trigger automated or semi-automated corrective action. In this way, PACE 64 may construct and apply a ML model based on the particular complex network in which PACE 64 is deployed to determine whether to perform further, resource-intensive analysis on incoming streams of network event data collected (e.g., in real-time) from elements within the complex network system. By collecting data relating to the responses to probe packets received by edge network devices, such as router 10, and analyzing such data, server 34 may determine whether a QoE issue that a subscriber device may be experiencing is caused by SaaS network 24 or whether the QoE issue is caused by a network device outside of SaaS network 24. If the issue is caused by SaaS network 24, server 34 may provide a notification to the operator of SaaS network 24 informing them of a problem with SaaS network 24. If the issue is caused by a network device outside of SaaS network 24, server 34 (when implementing a network management system) may reroute meaningful data flows to improve the QoE of the SaaS application.

Further example details of root cause analysis and automatic correction techniques that may be performed by server 34 are described in U.S. patent application Ser. No. 17/303,222, entitled "VIRTUAL NETWORK ASSISTANT HAVING PROACTIVE ANALYTICS AND CORRELATION ENGINE USING UNSUPERVISED ML MODEL," filed Apr. 20, 2021, the entire contents of which is incorporated by reference herein.

Example fault detection systems having aspects that may be employed by server 34 are described in U.S. Pat. No. 10,958,585, entitled "METHODS AND APPARATUS FOR FACILITATING FAULT DETECTION AND/OR PREDICTIVE FAULT DETECTION," issued on Mar. 23, 2021; U.S. Pat. No. 9,832,082, entitled "MONITORING WIRELESS ACCESS POINT EVENTS," issued on Nov. 28, 2017; U.S. Pat. No. 10,958,537, entitled "METHOD FOR SPATIO-TEMPORAL MONITORING," issued on Mar. 23, 2021; and U.S. Pat. No. 10,985,969, entitled "SYSTEMS AND METHODS FOR A VIRTUAL NETWORK ASSISTANT," issued on Apr. 20, 2021, the entire contents of each of which are incorporated by reference herein.

In some examples, processing circuitry 52 may include VNA/AI engine 60. Processing circuitry 52 may determine, based one or more characteristics of a data flow associated with an application, that a quality of the data flow is meaningful to a quality of experience of the application (e.g., is a meaningful flow). For example, processing circuitry 52 may determine that a data flow is a video data flow associated with the application executing on servers 28A-28N, for example, by reading a flow table from a message from router 10. In response to determining that the quality of the data flow is meaningful to a quality of experience of the application, processing circuitry 52 may determine a network address and probe protocol usable for probing a first network device associated with a source of the application. The first network device may be a server, such as server 28A, that is responsive to the probing, the server executing the application for the data flow, or a closest network device (as defined above), to the server, that is responsive to the probing, such as router 22. Communication circuitry 54 may send to a second network device, such as router 10, at a location serviced by the application, such as branch office 4, a message specifying the network address and probe protocol usable for probing the first network device.

Processing circuitry 52 may determine heuristics associated with a data flow. The heuristics may include a start time associated with the data flow and an end time associated with the data flow. In some examples, the heuristics may include a day of the week associated with the data flow. For example, processing circuitry 52 may read a flow table in a message from router 10 to determine the start time associated with the data flow, the end time associated with the data flow, or the day of the week associated with the data flow.

In some examples, the data flow is one of a plurality of data flows and the application is one of a plurality of applications. In such cases, processing circuitry 52 may determine the most-used applications of the plurality of applications. Processing circuitry 52 may rank the most-used applications based on usage (e.g., usage at a given location, through a given edge network device such as router 10, or through a given interface port of an edge network device). Processing circuitry 52 may determine most-used servers executing one of the plurality of data flows associated with the second network device (e.g., router 10). Processing circuitry 52 may also rank the most-used servers based on the ranking of the most-used applications and the determination of the most-used servers.

In some examples, the first network device (e.g., server 28A) is one of a plurality of first network devices (e.g., servers 28A-28N, load balancer 26, router 22, or the like). Communication circuitry 54 may send a message to the second network device. In some examples, the message includes the ranking of the most-used applications, and for each of the plurality of data flows of the most-used applications, the ranking of the most-used servers for a respective data flow of the plurality of data flows. In some examples, the ranking of the most-used servers includes a plurality of rankings of the most-used servers, wherein each of the plurality of rankings is associated with a different time of day or a different day of the week.

The message may also include the network address and probe protocol for each respective first network device of the plurality of first network devices. In some examples, the message may include a listing of the network addresses and probe protocols for which the second network device should probe. In some examples, communication circuitry 54 may send the message periodically. For example, communication circuitry 54 may send the message according to a schedule, such as daily, weekly, or the like.

While several techniques of this disclosure have been discussed with respect to server 34, in some examples, these techniques may be performed by other network devices or a combination of network devices. For example, the techniques may be performed by router 32, another router, or another server.

Figure 3:
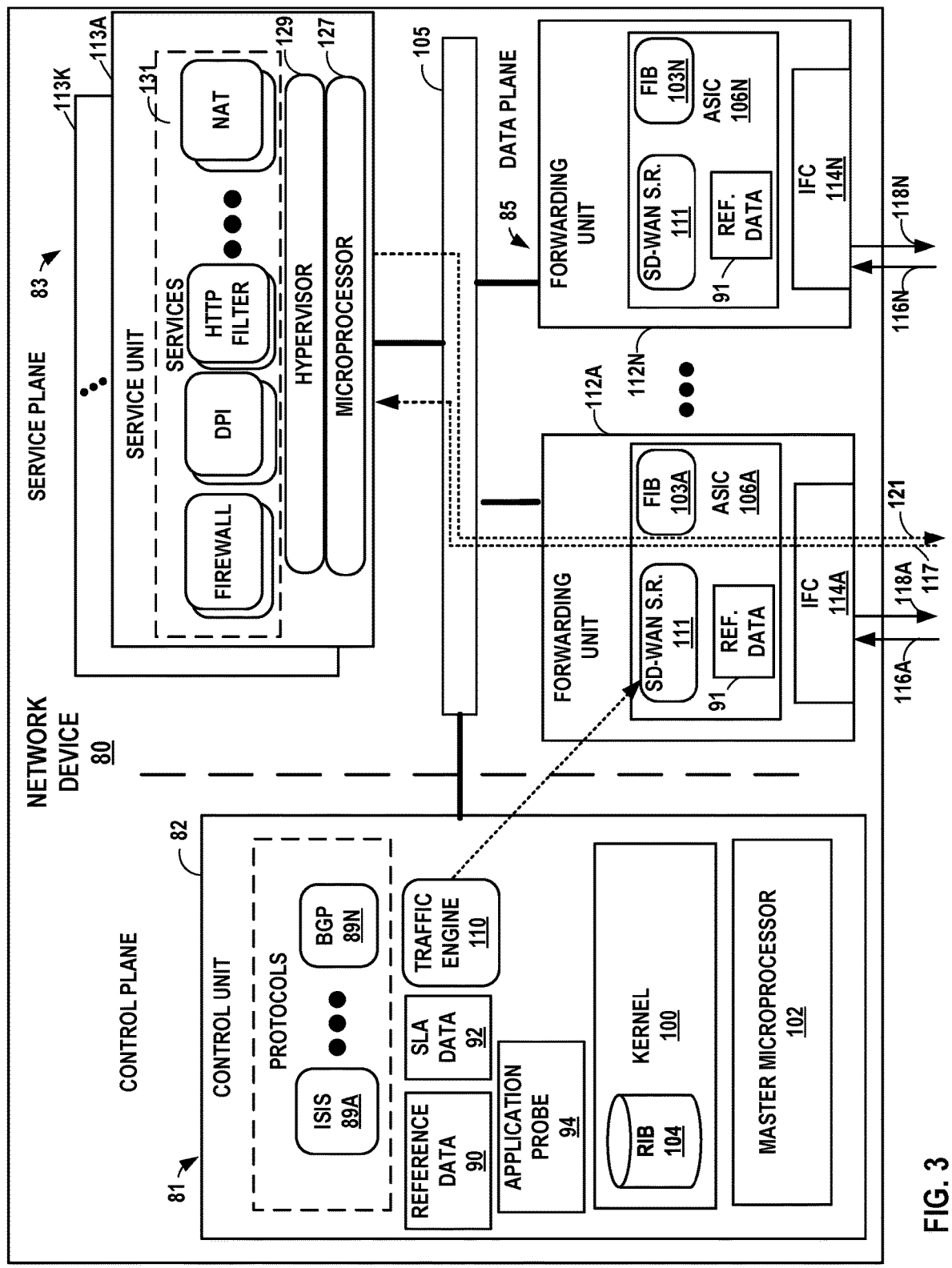
FIG. 3 is a block diagram illustrating an example network device configured to execute one or more adaptable application-specific probing techniques in accordance with the techniques of this disclosure.

FIG. 3 is a block diagram illustrating an example network device configured to execute one or more adaptable application-specific probing techniques in accordance with the techniques of this disclosure. While the network device may be any network device configured to perform the techniques described herein, the network device may be an example of server 34, router 10, server 12, router 14, server 16, or router 32 of FIG. 1. Moreover, while described with respect to a particular network device, e.g., a router, the techniques may be implemented by any network device that may operate as an SD-WAN appliance, such as a client device, a Layer 3 (L3) or L2/L3 switch, or server.

In this example, network device 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, network device 80 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of network device 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as traffic engine 110 and services 131, may be operable by microprocessor 102 to perform various actions, operations, or functions of network device 80. For example, microprocessor 102 of network device 80 may retrieve and execute instructions stored by various data stores that cause microprocessor 102 to perform the operations of traffic engine 110 and services 131.

One or more storage components (e.g., RIB 104) within network device 80 may store information for processing during operation of network device 80 (e.g., network device 80 may store data accessed by traffic engine 110 and services 131 during execution at network device 80). In some examples, the storage component is a temporary memory, meaning that a primary purpose of the storage component is not long-term storage. Storage components on network device 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with traffic engine 110 and services 131. Storage components 248 may include a memory configured to store data or other information associated with traffic engine 110 and services 131.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by network device 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of network device 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of network device 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for network device 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of network device 80. Operations may be performed, for example, on each packet based on any of a corresponding ingress interface, an ingress PFE of IFC cards 114, an egress PFE of IFC cards 114, an egress interface or other components of Network device 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of network device 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for traffic engine 110. In some examples, control unit 82 may use traffic engine 110 to execute one or more TWAMP or RPM logical roles, such as a control client, a server, a sessions sender, and a session reflector. In some examples, traffic engine 110 may perform a deep packet inspection on data flows to determine a start time, a stop time, and a classification of the data flows, for example, a video data flow.

One of the characteristics of the data flow may be type or classification of the data flow. In the example where network device 80 represents an edge network device such as router 10, Traffic engine 110 may perform a deep packet inspection of data flows to determine which data flows are meaningful data flows. In some examples, network device 80 may store a start time, an end time, and a network address of a server associated with each meaningful flow. Network device 80 may send a message including a flow table which includes start time, an end time, and a network address of a server associated with each meaningful flow to server 34 (FIG. 1).

According to the techniques of this disclosure, network device 80 may receive a message from a probe management network device (e.g., server 34 of FIG. 1). In some examples, the message may include a ranking of the most-used applications. For each of the most-used applications, the message may include a ranking of most-used servers for a respective most-used application and a respective network address and respective probe protocol for each of a plurality of network devices for the respective most-used application. For example, master microprocessor 102 may store the information from the message in application probe model 94. In some examples, application probe model 94 may also include a probe packet budget. The probe packet budget may be a static predetermined number, or may change over time based on available bandwidth or available processing power of master microprocessor 102. A probe packet budget may be represented by a number of probe packets to be sent, a number of probe packets to be sent in a predetermined time period, a processing power used to send probe packets and process responses to the probe packets, a processing power used to send probe packets and process responses to the probe packets in a predetermined time period, a number of meaningful data flows to be probed, a number of meaningful data flows to be probed over time, bandwidth used to send the probe packets and receive the responses to the probe packets in a predetermined time period, or the like. Network device 80 may store the probe packet budget in application probe model 94. Network device 80 may also implement a manner of tracking the probe packet budget and the use of the probe packet budget in application probe model 94. For example, network device 80 may include a counter that is incremented or decremented each time network device 80 sends a probe packet or receives a response or each time network device 80 probes a different meaningful data flow. In another example, network device 80 may track bandwidth used or processing power used associated with sending probe packets and receiving or processing responses to the probe packets. In this manner, network device 80 may send probe packets and remain within its probe packet budget.

Network device 80 may determine, based on the ranking of the most-used application, the ranking of the most-used servers, and the probe packet budget, a subset of the plurality of network devices which may be stored in application probe model. The determined subset of the plurality of network devices includes those network devices to which network device 80 is going to send probe packets such that traffic engine 110 will not exceed the probe packet budget. Traffic engine 110 may send an out-of-band probe packet to each of the subset of the plurality of network devices, based on the respective network address and the respective probe protocol. Each of the plurality of network devices may be a server, such as server 28A of FIG. 1, that is responsive to probing, the server executing the application for a respective data flow, or a closest network device (as defined above), such as router 22, to the server, that is responsive to the probing.

Figure 4:
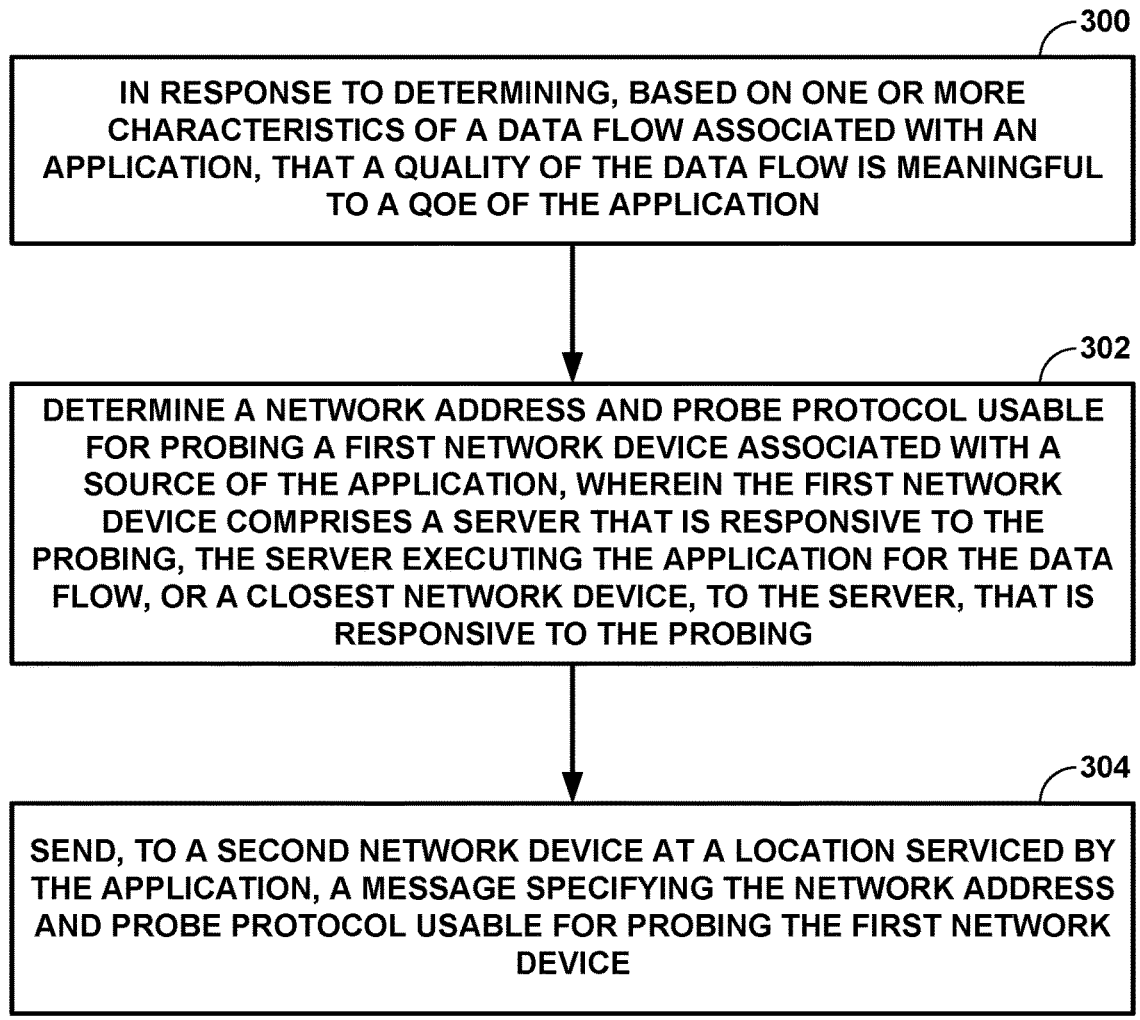
FIG. 4 is a flow diagram illustrating an example technique for determining an adaptable application-specific probing scheme in accordance with the techniques of this disclosure.

FIG. 4 is a flow diagram illustrating an example technique for determining an adaptable application-specific probing scheme in accordance with the techniques of this disclosure. The example operation may be performed by a probe management network device, such as server 34, an edge network device, such as router 10, or a combination of a probe management network device and an edge network device.

In accordance with the techniques described herein, server 34 may, in response to determining, based on one or more characteristics of a data flow associated with an application, that a quality of the data flow is meaningful to a QoE of the application (300) take the actions set forth in the rest of FIG. 4. For example, server 34 may determine that a quality of the data flow is meaningful to a QoE of the application based on the data flow being a video data flow.

Server 34 may determine a network address and probe protocol usable for probing a first network device associated with a source of the application, wherein the first network device comprises a server, e.g., server 28A, that is responsive to the probing, the server executing the application for the data flow, or a closest network device (as defined above), to the server, e.g., router 22, that is responsive to the probing (302). For example, server 34 may attempt to send a probe packet having a first probe protocol to a server of servers 28A-28N. If the server responds to the probing, server 34 may store the network address of the responsive server and the probe protocol used to elicit the response in memory. If the server does not respond, server 34 may send a probe packet having a different probe protocol. Server 34 may continue attempting to elicit a response to the probing using different probe protocols until it has exhausted each of the probe protocols that server 34 is capable of utilizing. If the server is not responsive to the probing with any of the probe protocols, server 34 may attempt to probe a nearby network device in an attempt to elicit a response from that network device. Server 34 may continue using different probe protocols and different network addresses until server 34 has successfully elicited a response to probing from a network device, such as router 22.

Server 34 may send, to a second network device, e.g., router 10, at a location serviced by the application, a message specifying the network address and probe protocol usable for probing the first network device (304). For example, server 34 may send a message indicating which network address and which protocols router 10 should probe with the limited probe budget of router 10. If server 34 is not successful in eliciting a response to probing from any network device using any probe protocols, in some examples server 34 may send a message to the second network device, the message indicating that probing the meaningful flow of the application is not currently possible. In other examples, in this circumstance the server 34 may send no message to the second network device. In some examples, in this circumstance, server 34 may cease attempting to elicit a response to a probe packet from any network device. In other examples, server 34 may begin the process of attempting to elicit a response to a probe packet again at a later time.

In some examples, server 34 may determine heuristics associated with the data flow. In some examples, the heuristics include a start time associated with the data flow and an end time associated with the data flow. For example, router 10 may monitor the start times and stop times of meaningful flows and send a message including the start times and stop times to server 34. Server 34 may read the message as part of determining the heuristics.

In some examples, the data flow is one of a plurality of data flows and the application is one of a plurality of applications. In such examples, server 34 may determine the most-used applications of the plurality of applications. In some examples, server 34 may rank the most-used applications based on usage, for example, by subscriber devices at given location, associated with a particular edge network device such as router 10, or associated with a particular port of an edge network device.

In some examples, server 34 determines the most-used servers executing one of the plurality of data flows associated with the second network device. In some examples, server 34 ranks the most-used servers based on the ranking of the most-used applications and the determination of the most-used servers.

In some examples, the first network device is one of a plurality of first network devices, and server 34 sends a message to the second network device, the message including: the ranking of the most-used applications; and for each of the plurality of data flows of the most-used applications, the ranking of the most-used servers for a respective data flow of the plurality of data flows; and the network address and probe protocol for each respective first network device of the plurality of first network devices. In some examples, the ranking of the most-used servers comprises a plurality of rankings of the most-used servers, wherein each of the plurality of rankings is associated with a different time of day and/or a different day of the week. In some examples, the message is sent periodically. For example, the message may be sent according to a schedule, such as daily, weekly, or the like.

In some examples, router 10 sends an out-of-band probe packet to the first network device. In some examples, router 10 receives a response to the out-of-band probe packet. In some examples, router 10 determines a quality of experience based on the response.

In some examples, router 10 performs a deep packet inspection of the data flow to determine the one or more characteristics of the data flow.

In some examples, a network device includes memory configured to store data indicative of a probe packet budget and one or more processors communicatively coupled to the memory. The one or more processors may be configured to receive a message from a probe management network device, the message including a ranking of the most-used applications. For each of the most-used applications, the message may include a ranking of most-used servers for a respective most-used application and a respective network address and respective probe protocol for each of a plurality of network devices for the respective most-used application. The one or more processors may be configured to determine, based on the ranking of the most-used application, the ranking of the most-used servers, and the probe packet budget, a subset of the plurality of network devices and send an out-of-band probe packet to each of the subset of the plurality of network devices, based on the respective network address and the respective probe protocol. Each of the plurality of network devices may be a server that is responsive to probing, the server executing the application for a respective data flow, or a closest network device, to the server, that is responsive to the probing.

In some examples, one or more processors are further configured to, for each sent out-of-band probe packet, receive a respective response from a respective one of the subset of the plurality of network devices and determine a respective quality of experience based on the respective response. In some examples, the one or more processors are further configured to send a quality of experience message to the probe management network device based on the determined respective quality of experience. The quality of experience message may include information associated with the responses to the probe packet received by the network device.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A network system comprising:
   memory configured to store data indicative of a predefined probe packet budget; and
   processing circuitry communicatively coupled to the memory and configured to:
      receive a message comprising:
         a ranking of most-used applications associated with the network system; and
         for each of the most-used applications:
            a ranking of most-used servers for a respective most-used application; and
            a respective network address and respective probe protocol for each of a plurality of network devices associated with the most-used servers;
      determine a subset of the plurality of network devices, based on the ranking of the most-used applications, the ranking of the most-used servers, and the predefined probe packet budget; and
      send an out-of-band probe packet, the out-of-band probe packet not carrying live traffic, to each of the subset of the plurality of network devices, using the respective network address and the respective probe protocol.

2. The network system of claim 1, wherein each of the plurality of network devices comprises one of:
   a respective server of the most-used servers that is responsive to probing by a probe management network device, the respective server executing a respective most-used application for a respective data flow; or
   a closest network device, to the respective server, that is responsive to the probing by the probe management network device.

3. The network system of claim 2, wherein processing circuitry is configured to receive the message from the probe management network device.

4. The network system of claim 1, wherein the processing circuitry is further configured to, for each sent out-of-band probe packet:
- receive a respective response from a respective one of the subset of the plurality of network devices; and
- determine a respective quality of experience based on the respective response.

5. The network system of claim 4, wherein the processing circuitry is further configured to:
- send a quality of experience message to a probe management network device based on the determined respective quality of experience.

6. The network system of claim 1, further comprising an edge network device comprising the memory and the processing circuitry.

7. The network system of claim 6, wherein the edge network device comprises a router.

8. The network system of claim 6, wherein the ranking of most-used applications associated with the network system comprises a ranking of most-used applications associated with the edge network device.

9. A networking method comprising:
- receiving a message comprising:
  - a ranking of most-used applications associated with a network system; and
  - for each of the most-used applications:
    - a ranking of most-used servers for a respective most-used application; and
    - a respective network address and respective probe protocol for each of a plurality of network devices associated with the most-used servers;
- determining a subset of the plurality of network devices, based on the ranking of the most-used applications, the ranking of the most-used servers, and a predefined probe packet budget; and
- sending an out-of-band probe packet, the out-of-band probe packet not carrying live traffic, to each of the subset of the plurality of network devices, using the respective network address and the respective probe protocol.

10. The networking method of claim 9, wherein each of the plurality of network devices comprises:
- a respective server of the most-used servers that is responsive to probing by a probe management network device, the respective server executing a respective most-used application for a respective data flow; or
- a closest network device, to the respective server, that is responsive to the probing by the probe management network device.

11. The networking method of claim 10, wherein receiving the message comprising receiving the message from the probe management network device.

12. The networking method of claim 9, further comprising, for each sent out-of-band probe packet:
- receiving a respective response from a respective one of the subset of the plurality of network devices; and
- determining a respective quality of experience based on the respective response.

13. The networking method of claim 12, further comprising:
- sending a quality of experience message to a probe management network device based on the determined respective quality of experience.

14. The networking method of claim 9, wherein the method is performed by an edge network device.

15. The networking method of claim 14, wherein the edge network device comprises a router.

16. The networking method of claim 14, wherein the ranking of most-used applications associated with the network system comprises a ranking of most-used applications associated with the edge network device.

17. Non-transitory computer-readable storage media comprising instructions, which, when executed by processing circuitry, cause the processing circuitry to:
- receive a message comprising:
  - a ranking of most-used applications associated with a network system; and
  - for each of the most-used applications:
    - a ranking of most-used servers for a respective most-used application; and
    - a respective network address and respective probe protocol for each of a plurality of network devices associated with the most-used servers;
- determine a subset of the plurality of network devices, based on the ranking of the most-used applications, the ranking of the most-used servers, and a predefined probe packet budget; and
- send an out-of-band probe packet, the out-of-band probe packet not carrying live traffic, to each of the subset of the plurality of network devices, using the respective network address and the respective probe protocol.

18. The non-transitory computer-readable storage media of claim 17, wherein each of the plurality of network devices comprises:
- a respective server of the most-used servers that is responsive to probing by a probe management network device, the respective server executing a respective most-used application for a respective data flow; or
- a closest network device, to the respective server, that is responsive to the probing by the probe management network device.

19. The non-transitory computer-readable storage media of claim 18, wherein instructions cause the processing circuitry to receive the message from the probe management network device.

20. The non-transitory computer-readable storage media of claim 17, wherein the instructions further cause the processing circuitry to, for each sent out-of-band probe packet:
- receive a respective response from a respective one of the subset of the plurality of network devices; and
- determine a respective quality of experience based on the respective response.

* * * * *